3,788,996
COATING COMPOSITIONS CONTAINING
POLYMERIC DISPERSING AIDS

Darrell R. Thompson, Somerville, N.J., assignor to E. I. du Pont de Nemours and Company, Wilmington, Del.
No Drawing. Continuation-in-part of application Ser. No. 39,535, May 21, 1970, which is a continuation-in-part of application Ser. No. 776,774, Nov. 18, 1968, both now abandoned. This application Apr. 12, 1971, Ser. No. 133,420
Int. Cl. H01f 1/28; C09d 3/48
U.S. Cl. 252—62.54                     7 Claims

ABSTRACT OF THE DISCLOSURE

A coating composition which comprises
(a) an organic liquid,
(b) a film forming polymer,
(c) particles dispersed in the liquid, and
(d) molecules of a linear polymeric material represented by the structure

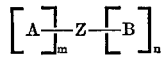

where
A is an organic moiety bearing a multiplicity of the same or different functional groups adsorbed on the pigment particles;
$m$ and $n$ are 1, 2 or 3 (the total not exceeding 4);
Z is an organic linking radical; and
B is a polymeric segment of ethylenically unsaturated monomers, being extended into the organic liquid.

CROSS-REFERENCE TO RELATED APPLICATIONS

This application is a continuation-in-part of applications Ser. No. 776,774, filed Nov. 18, 1958 now abandoned and Ser. No. 39,535, filed May 21, 1970 now abandoned.

STATEMENT OF THE INVENTION

This invention relates to coating compositions. It is more particularly directed to coating compositions comprising
(a) an organic liquid,
(b) a film forming polymer,
(c) particles dispersed in the liquid, and
(d) as an anti-flocculating agent, molecules of a linear polymeric material represented by the structure (1)
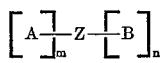

where
A is an organic moiety bearing a multiplicity of the same or different functional groups adsorbed on the pigment particles;
$m$ and $n$ are 1, 2 or 3 (the total not exceeding 4);
Z is an organic linking radical; and
B is a polymeric segment of ethylenically unsaturated monomers lacking Zerewitinoff hydrogen atoms, being extended into the organic liquid.

In describing the invention, the term "linear" is intended to describe molecules which are perfectly linear and also those which bear side chains but are still predominantly linear.

"Adsorbed" means the state of being concentrated on the surface of a particle. This includes both physical adsorption and chemisorption. For example, the adsorbed substance may be held by London dispersion forces, by polar interaction, by hydrogen bonding or pi bonding.

The coating compositions of the invention are remarkably resistant to pigment flocculation, which gives finishes derived from them higher initial gloss, better hiding and tinting strength and makes them resistant to color drift and gloss loss.

The film forming polymers in the compositions can be any of those ordinarily used in the preparation of coating compositions. Illustrative of such polymers are polyvinylchloride
polyvinylfluoride
polyvinylidine chloride
polyvinylidine fluoride
polymers and copolymers of acrylic and methacrylic acids and their amides, nitriles and esters with alkanols of 1 through 18 carbon atoms.

Polymers and copolymers of acrylic and methacrylic esters are preferred as film formers in the coating compositions.

Especially preferred are acrylic graft copolymers represented by the general structure A→B, where A is a copolymeric backbone segment of (1) an alkyl methacrylate whose alkyl group contains 1–4 carbon atoms, and
(2) allyl methacrylate (AMA) and/or diethylaminoethyl methacrylate (DEAM), and
B is poly 2-ethylhexyl acrylate (2-EHA), poly(butyl acrylate) (BA) or a copolymer of 2-EHA and BA.

Such graft copolymers and methods for their preparation are disclosed in greater detail in U.S. application Ser. No. 6,571, filed Jan. 28, 1970.

The coating compositions of the invention can contain any of the pigments ordinarily used in preparing paints and lacquers. For example, they can contain titanium dioxide, carbon black, zinc oxide, lead titanate, potassium titanate, antimony oxide, lithopone, phthalocyanine blue, quinacridone, "Irgazin"® yellow, ferric hydrates, and the like. The compositions can also contain metallic flake to enhance the appearance of the finishes.

The kinds of organic liquids used in the compositions will be dictated primarily by the chemical nature of the film-forming polymer used and the physical characteristics desired of the composition, i.e., whether it is to be a solution system or a dispersion system. The proper selection of an organic liquid for a particular film-former can be made quite easily by one skilled in the art by applying well-known and established principles of polymer chemistry and paint formulation. Illustrative of the organic liquids which can be used are aliphatic and aromatic hydrocarbons, ethers, esters, ketones, alcohols and mixtures of these. More detail on the selection of organic liquids for the preferred compositions of the invention will be found in the previously mentioned application Ser. No. 6,571, filed Jan. 28, 1970.

The antiflocculating agents preferred for use in compositions of the invention are those of Formula 1 wherein the adsorbed functional groups of the A substituent are polar, with Hammet substituent constants $\delta_I$-NMR, $\delta_I$Ar, or $\delta_P$ higher than $\delta$0.49 or lower than $\delta$—.20 (see J. P. Jesson and E. L. Muetterties, Chemist's Guide, Marcel Dekker, New York, 1969, p. 23).

Antiflocculating agents of Formula 1 wherein the adsorbed functional groups of the A substituent have hydrogen bound to elements of Groups V, VI, and VII of the Periodic Table with atomic numbers greater than 17, are also preferred.

Also preferred are the agents of Formula 1 wherein the adsorbed groups of the A substituent are functional groups which, when incorporated into simple organic compounds, give acids having $pK_a$ values of less than 5 in water, or which when incorporated into simple organic compounds give bases having $pK_b$ values of greater than 9.8 in water.

Also preferred are agents of Formula 1 wherein the adsorbed groups of the A substituent are ionic or zwitterionic.

The agents of Formula 1 especially preferred for use in the compositions of the invention are those wherein the A substituent is the residue of an acid radical, which as an entity, before reaction, has a $pK_a$ value of $-1$ to 6, even more preferably where A is the residue of a carboxyl bearing radical, still more preferably where A is the residue of a mercapto-, hydroxy- or carboxy substituted carboxylic acid radical or where A is

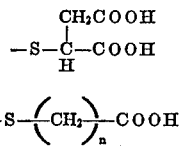

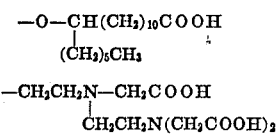

(where $n$ is 1-3)

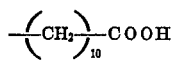

or

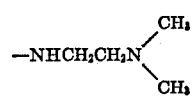

Also especially preferred are those agents of Formula 1 wherein A is the residue of an alkoxysilane radical, even more preferably the residue of a mercapto-, hydroxy-, or aminoalkyl trialkoxy silane radical, still more preferably where A is $-\overset{H}{N}(CH_2)_2NH(CH_2)_3Si(OCH_3)_3$ $-\overset{H}{N}(CH_2)_3Si(OCH_2CH_3)_3$ $-S(CH_2)_3Si(OCH_3)_3$ or

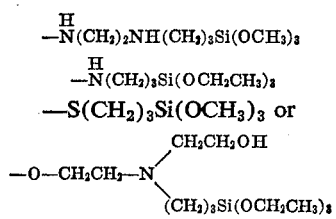

Also especially preferred are those agents of Formula 1 wherein A is the residue of a basic radical which as an entity before reaction, has a $pK_a$ value of 5-14, or a salt thereof, even more preferably where A is the residue of an amine or amine salt radical, still more preferably where A is the residue of an amino-, hydroxy- or mercapto-substituted amine or amine salt radical, or where A is

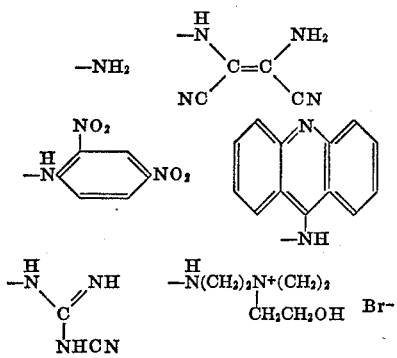

or

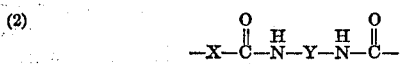

Antiflocculating agents also preferred for use in the compositions of the invention are those of Formula 1 wherein Z is (2)    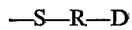

where

X is the residue of a chain transfer agent, and
Y is the residue of a di-, tri-, or tetraisocyanate radical.

Also preferred are those agents of Formula 1 wherein Z is as shown in Formula 2 above, where X is

—S—R—D where R is alkylene of 1-6 carbon atoms, and D is

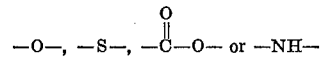

Especially preferred are those agents of Formula 1 wherein Z is

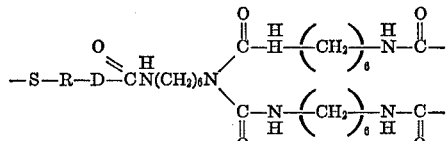

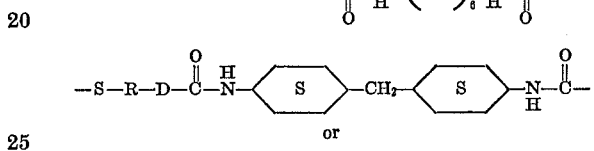

or

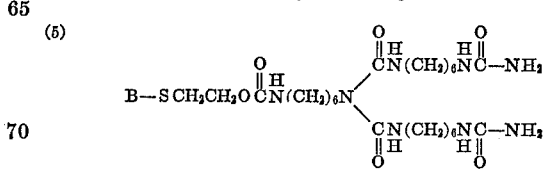

where R and D are defined as above.

Also especially preferred are those agents of Formula 1 where B is a polymeric or copolymeric segment of (a) an ester of acrylic acid (AA) or methacrylic acid (MAA) with an alkanol of 1-18 carbon atoms;
(b) styrene (S) or acrylonitrile (AN);
(c) a vinyl ester whose ester moiety contains 2-18 carbon atoms; or
(d) a vinyl ether.

Most preferred are those agents of Formula 1 wherein substituent B is a polymeric segment one of whose monomer units is methyl methacrylate (MMA), more specifically, where it is a copolymeric segment of MMA and an ester of AA or MAA with an alkanol of 2-12 carbon atoms, still more specifically, where B is an MMA/2EHA copolymeric segment, all having a number average molecular weight of 500-100,000, preferably 1,000-10,000.

The polymeric antiflocculating agents most preferred for use in compositions of this invention are those represented by the structures (3) 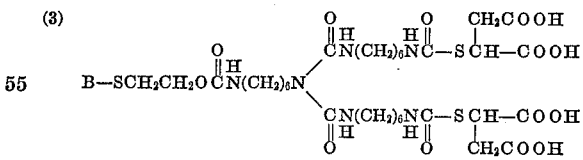

(4) 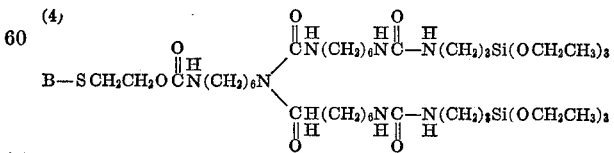

(5) 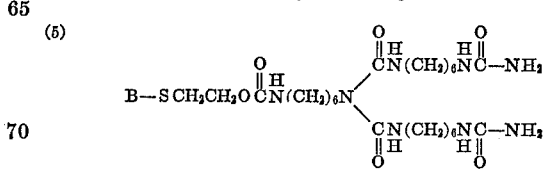

where B in each of a MMA/2-EHA copolymer segment.

The coating composition most useful for the purposes of the invention will accordingly contain as a film-forming polymer a graft copolymer whose backbone component is a copolymer of (1) an alkyl methacrylate of 1-4 carbon atoms, preferably MMA, and
(2) AMA and/or DEAM, whose graft component is poly 2-EHA, polyBA or a 2-EHA/BA copolymer, and whose dispersing agent is one of Formulas 3, 4 or 5. Such a composition is especially useful as an automotive lacquer.

Magnetic oxides such as iron oxide and chromium dioxide can also be the particulate matter in the dispersions. Such compositions are useful for preparing magnetic tape.

Dispersions containing 40 to 80%, by weight, of a magnetic oxide and 0.5–10%, by weight, of a polymeric material of the invention show improved adhesion to the tape substrate and improve the tape's electrical properties.

Preparation of the polymeric materials

The materials of the invention can be prepared according to the typical equation (1)
MMA + 2EHA + HSCH$_2$CH$_2$OH ⟶
                              MMA/2EHA polymer-SCH$_2$CH$_2$OH (2)
MMA/2EHA polymer-SCH$_2$CH$_2$OH +

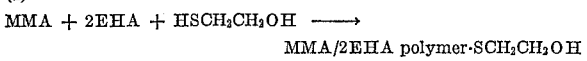

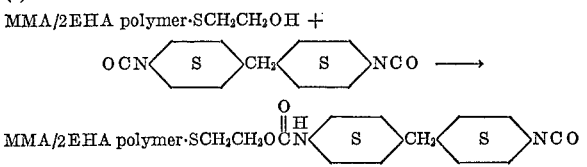

(3)

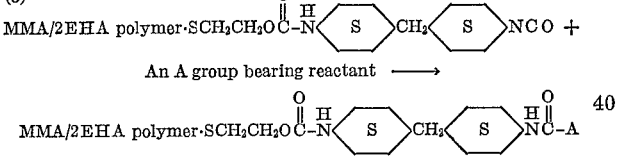

An A group bearing reactant ⟶

According to this scheme, a suitable organic liquid such as toluene, methylethyl ketone, methylisobutyl ketone, butyl acetate, ethyl acetate, benzene, xylene, an ether such as ethylene glycol diethyl ether or Cellosolve acetate, or mixtures of these, is heated at controlled temperature, preferably 50–120° C. Temperature is most easily controlled by using a liquid having a boiling point of 50–120° C. To this organic liquid is then added, over a four-hour period, a solution of the monomer(s) which is to produce the polymeric segment B of the polymeric material, a chain transfer agent bearing a functional group, such as 2-mercaptoethanol, 2-mercaptopropanol or 2-hydroxyethyl disulfide, and a free radical polymerization initiator such as azobisisobutyrontrile.

One chooses the proportions of monomer, chain transfer agent and initiator according to the formula $$MW_n = \frac{\text{total mols monomer}}{\text{Total mols transfer agent} + X \text{ (mols of initiator)}}$$

(where X is the number of free radicals per mol of catalyst and MW$_n$ is the number average molecular weight of the polymer desired.)

It is desirable that the monomer, chain transfer agent and initiator be in solution. If they are not, enough of an appropriate solvent such as Cellosolve acetate or toluene should be added to put them into solution.

The reaction mass is heated at 50–120° C. until reaction is about 95% complete, as determined by viscosity measurements. Ordinarily, at completion, the mass has a Gardner-Holdt viscosity of F to N. Four to five hours of heating is ordinarily enough.

An appropriate di- tri- or tetraisocyanate, in an amount equimolar to the chain transfer agent, is then added to the reaction mass, still at elevated temperature. Illustrative of isocyanates which can be used are

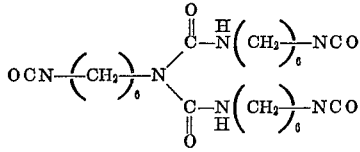

(Desmodur N, sold by Farbenfabriken Bayer, AG.)

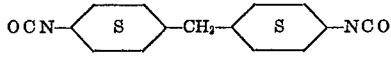

("Hylene"® W organic isocyanate, sold by E. I. du Pont de Nemours and Company.)

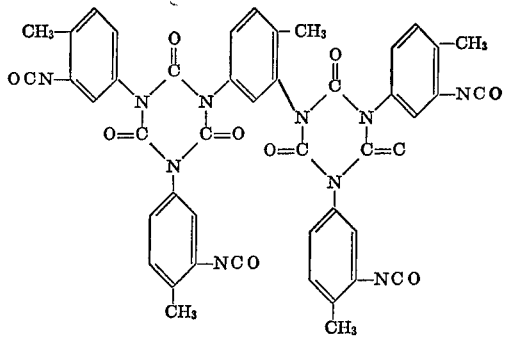

(Desmodur IL, sold by Farbenfabriken Bayer, AG.)

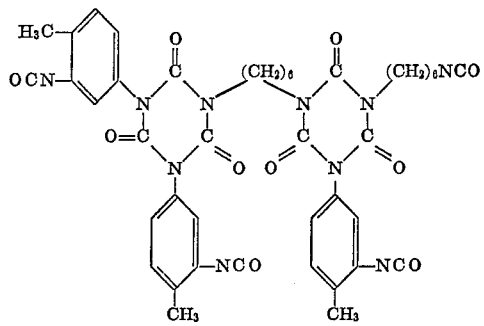

(Desmodur HL, sold by Farbenfabriken Bayer, AG) and toluene diisocyanate.

A catalyst for the isocyanate reaction is then added to the reaction mass. Illustrative of such a catalyst are dibutyltin dilaurate and tertiary amines such as triethylenediamine. The amount of isocyanate reaction catalyst used is ordinarily 0.5 to about 2%, by weight of the isocyanate used.

The reaction mass is then refluxed until the isocyanate chain transfer agent reaction is complete. This ordinarily takes from 5 to 60 minutes at 80° C.

The reactant which provides the A moiety of the polymeric material is then added as a solution in one of the organic liquids previously mentioned. The amount used is about 0.8–1, preferably 0.95 molar, based on unreacted isocyanate. The reaction mass is then heated at 25–120° C., with stirring, for another 5–60 minutes. Heat need not be applied if mercapto acids or amines which react readily at 25° C., are used.

The A moiety-providing reactant can be any acid having a pK$_a$ value of —1 to 6, any base having a pK$_a$ value of 5–14, or any silane radical bearing a radical capable of reacting with an isocyanate, such as —SH, —H, and —NH$_2$.

Amine salts can be made by neutralizing the product with acid, by reacting it with an alkyl halide such as methyl iodide, or by other conventional methods.

The dispersing agent can be used in solution, as prepared.

How the compositions are made

The compositions of the invention are made using conventional techniques.

The solution or dispersion af film-forming polymer is first prepared in the usual fashion.

A pigment dispersion is then prepared separately by dissolving from about 0.001 to about 2 grams of the polymeric anti-flocculating agent per square meter [1] of surface area of the pigment particles, preferably 0.004 to about 0.1 gram per suare meter, in an organic liquid which must, of course, be compatible with the other ingredients in the composition. This pigment dispersion is then sand-ground, ball-milled or otherwise subjected to shear and added directly to the solution or dispersion of the film-forming polymer.

As is well-known in the art, other adjuncts can be added to the composition, such as plasticizers, coalescing agents, fillers, deodorants and the like, in the usual amounts. Plasticizers especially suited for the preferred compositions are disclosed in detail in previously mentioned application Ser. No. 6,571, and in application Ser. No. 31,764,, filed Apr. 24, 1970.

The compositions can be applied conventionally by spraying, brushing, dipping, doctor-blading or roller coating. They are then baked at temperatures of from 100° C. to 300° C. for about 0.5 to 60 minutes, to give hard, durable, glossy finishes.

Dispersions of magnetic oxides used for preparing magnetic tape can be made by first preparing a slurry of magnetic oxide in a small amount of a solution of binder resin and deflocculating agent in an organic liquid such as cyclohexanone, methylethyl ketone, methylisobutyl ketone, toluene, dioxane or tetrahydrofuran. This slurry is then ball-milled for 24–48 hours. To the slurry is then added the remainder of the binder resin, solvent and such lubricants, curing agents or other adjuncts as are desired. The resulting dispersion is ball milled for 2–4 hours and is then ready for use.

These dispersions can then be applied to conventional tape substrate usually made of cellulose acetate or "Mylar"® polyester film,[2] in the customary way, and then cured, usually by baking for a short period.

PREFERRED EMBODIMENTS OF THE INVENTION

The following examples are submitted so that the invention may be more readily understood and practiced. Those skilled in the art will no doubt be able to compose numerous variations on their central theme. It is naturally considered that these variations are a part of the invention.

In the examples, all parts are by weight.

Example 1

(A) Toluene (226.7 parts) was placed in a steel reaction kettle, heated to reflux temperature and held there. A solution of 226.7 parts of MMA, 126 parts of 2-EHA, 90.7 parts of toluene, 4.44 parts of 2 mercaptoethanol and 0.903 part of azobisisobutyronitrile was then slowly added to the kettle over a four hour period.

Refluxing was continued as a solution of 0.25 part of azobisisobutyronitrile in 2.5 parts of methylisobutyl ketone was added in three equal portions at intervals of 15 minutes. A water separator was attached to the kettle and refluxing was continued for another 45 minutes to remove water.

---
[1] Measured by the Brunauer, Emmett and Teller nitrogen adsorption method described on pages 29–32 of "Colloidal Dispersions" by Earl K. Fischer, published by John Wiley and Sons in 1950.
[2] E. I. du Pont de Nemours and Company. The preferred film is that described in U.S.P. 3,397,072.

(B) Desmodur N (43.21 parts) was then added to the reaction mass and its container rinsed with 3.78 parts of toluene, which was also added to the mass. The mixture was stirred for 5 minutes.

Dibutyltin dilaurate (0.51 part) was then added and its container rinsed with 1.89 parts of toluene, which was also added to the mixture.

This solution was refluxed for one hour.

(C) The solution was then cooled to about 65° C. and stirred as a solution of 17.09 parts of mercaptosuccinic acid in 120.9 parts of methylethyl ketone was added. The container was rinsed with 3.78 parts of methylethyl ketone, which was also added to the solution. After 30 minutes of stirring at 60–75° C., 0.85 part of acetic anhydride was added.

The resulting product was a solution, 48% solids, of a polymeric material having the general formula

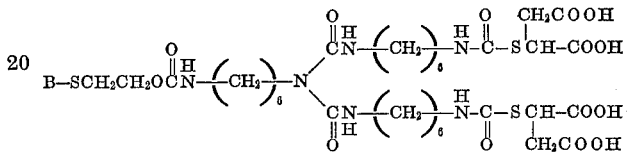

where B is a MMA/2EHA copolymeric segment.

A mixture of 62.5 parts of this solution, 65 parts of phthalocyanine blue pigment 168 parts of xylene and 66 parts of 2-butoxyethyl acetate was sand-milled to produce a fluid dispersion. This dispersion was then mixed with a clear thermosetting acrylic enamel vehicle in an amount that provides 2 parts of pigment per 100 parts of polymeric binder. The resulting homogeneous enamel was doctor-bladed to glass panel and baked at about 160° C. to give a highly transparent, glossy blue film.

Example 2

Toluene (900 parts) was placed in a reaction flask, heated to reflux temperature and held there. To the toluene was then added, continuously over a 4 hour period, a solution of 1540 parts of MM9, 20.3 parts of 2-mercaptoethanol, 4.1 parts of azobisisobutyronitrile and 300 parts of toluene.

Refluxing was continued while a solution of 3.4 parts of azobisisobutyronitrile in 38 parts of methylisobutyl ketone was added in three equal portions at 15 minute intervals. Refluxing was then continued for another 30 minutes, with water removal.

Desmodur N (197.3 parts) was then added to this solution and its container rinsed with 17 parts of toluene, which was also added.

After the mass had been stirred another 5 minutes, 1.2 parts of dibutyltin dilaurate were added. This solution was heated at reflux temperature for 30 minutes and then cooled to 65° C.

To this solution was then added a solution of 74.1 parts of mercaptosuccinic acid in 520 parts of methylethyl ketone. The container was rinsed with 20 parts of methylethyl ketone, which was also added to the mass. The resulting solution was then stirred for 15 minutes at 60–70° C. and 4 parts of acetic anhydride were added.

The resulting product was a solution, 46% solids, of a polymeric material represented by the formula

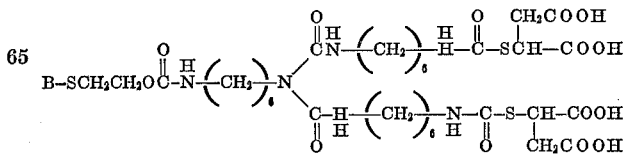

where B is poly(MMA).

A mixture of 46 parts of this solution, 70 parts of phthalocyanine blue pigment, 224 parts of xylene and 10 parts of 2-ethoxyethyl acetate was sand-milled. The viscosity of the resulting dispersion was less than 50 centipoise, indicating excellent deflocculation.

The dispersion was mixed with a plasticized poly(MMA)lacquer containing metallic flake. This lacquer was doctor-bladed on steel and baked at 160° C. to produce a glossy film having excellent appearance.

Example 3

A polymeric material was prepared by the method of Example 2, using 1312 parts of MMA and 280 parts of BA in place of the MMA used in Example 2.

Example 4

A polymeric material was prepared by the method of Example 2, except that the first feed solution was composed of 1170 parts of lauryl methacrylate (LMA), 270 parts of ethyl acrylate (EA), 360 parts of MMA, 20.2 parts of 2-mercaptoethanol, 4.1 parts of azobisisobutyronitrile and 300 parts of toluene.

The resulting solution contained a polymeric material represented by the formula $$B-SCH_2CH_2O\overset{O}{\overset{\|}{C}}-\overset{H}{N}-(CH_2)_6-N\diagup\diagdown\begin{matrix}\overset{O}{\overset{\|}{C}}N-(CH_2)_6-N\overset{H}{\overset{|}{C}}-S\overset{CH_2COOH}{\overset{|}{CH}}-COOH\\ \\ C-N-(CH_2)_6-N-C-S-CH-COOH\\ \overset{\|}{O}\overset{}{}\overset{H}{}\overset{}{}\overset{\|}{O}\overset{}{}\overset{|}{CH_2COOH}\end{matrix}$$

where B is a LMA/EA/MMA terpolymer segment.

Example 5

To the intermediate polymeric material prepared in part (B) of Example 1 was added 1 mol of thioglycollic acid for each equivalent weight of unreacted isocyanate.

The mixture was heated at reflux temperature for 1 hour to give a solution of polymeric material represented by the general formula $$B-SCH_2CH_2O\overset{O}{\overset{\|}{C}}-\overset{H}{N}-(CH_2)_6-N\diagup\diagdown\begin{matrix}\overset{O}{\overset{\|}{C}}N-(CH_2)_6-N-\overset{O}{\overset{\|}{C}}-SCH_2-COOH\\ \\ CN-(CH_2)_6-N-C-SCH_2-COOH\\ \overset{\|}{O}\overset{}{}\overset{H}{}\overset{}{}\overset{\|}{O}\end{matrix}$$

where B is a MMA/2-EHA copolymeric segment.

Example 6

β-mercaptopropionic acid was used in place of the thioglycollic acid used in the previous example.

The product was a polymeric material represented by the general formula $$B-SCH_2CH_2O\overset{O}{\overset{\|}{C}}N-(CH_2)_6-N\diagup\diagdown\begin{matrix}\overset{O}{\overset{\|}{C}}N-(CH_2)_6-NC-S(CH_2)_2COOH\\ \\ CN-(CH_2)_6-NC-S(CH_2)_2COOH\\ \overset{\|}{O}\end{matrix}$$

where B is a MMA/2-EHA copolymeric segment.

Coating compositions can be prepared with the polymeric materials of Examples 3-6 using the procedures of Example 1, with similar results.

Example 7

Methylethyl ketone (241.9 parts) was placed in a steel reaction kettle, heated to reflux temperature and held there. A solution of 219.9 parts of MMA, 131.9 parts of 2EHA, 66 parts of methylethyl ketone, 4.3 parts of 2-mercaptoethanol and 0.88 part of azobisisobutyronitrile was then slowly added to the kettle over a 4 hour period.

Refluxing was continued as a solution of 0.22 part of azobisisobutyronitrile in 4.2 parts of methylethyl ketone was added in three equal portions at intervals of 15, 30 and 45 minutes. Refluxing was then continued for another 30 minutes.

Desmodur N was then added to the reaction mass and its container rinsed with 11 parts of methylethyl ketone, which was also added to the mass. The mixture was stirred for 5 minutes.

Dibutyltin dilaurate (0.50 part) was then added and its container rinsed with 4.4 parts of methylethyl ketone, which was also added to the mixture.

This solution was then refluxed for two hours. The solution was then cooled to about 65° C. and stirred as 24.4 parts of γ-aminopropyltriethoxy silane were added. The container was rinsed with 33.6 parts of methylethyl ketone, which was also added to the solution. Stirring was continued for 15 minutes.

The resulting product was a solution, 48% solids, of a polymeric material having the general formula $$B-SCH_2CH_2O\overset{O}{\overset{\|}{C}}N(CH_2)_6N\diagup\diagdown\begin{matrix}\overset{O}{\overset{\|}{C}}N(CH_2)_6N\overset{O}{\overset{\|}{C}}-N(CH_2)_3Si(OCH_2CH_3)_3\\ \\ CN(CH_2)_6NC-N(CH_2)_3Si(OCH_2CH_3)_3\\ \overset{\|}{O}\overset{}{}\overset{\|}{O}\end{matrix}$$

where B is a MMA/2-EHA copolymeric segment.

(A) A mixture of 16.2 parts of this solution, 105 parts of an opaque iron oxide yellow pigment, 228.8 parts of xylene and 898 parts of sand was sand milled for 11 minutes and filtered to produce a fluid, highly deflocculated dispersion.

(B) An unpigmented acrylic organosol lacquer was prepared by mixing 546 parts of an organosol prepared according to Example 3 of application Ser. No. 6,571, filed January 28, 1970, 61.5 parts of plasticizer, 249 parts of coalescing solvent and 50 parts of aliphatic hydrocarbon.

(C) To 91.4 parts of this lacquer were added 13.7 parts of the (A) dispersion, 10 parts of coalescing solvent, 10 parts of xylene and 6 parts of VM and P naphtha.

When sprayed to film thickness of about 2 mils, this lacquer produced an opaque film having excellent image definition; 20° gloss was 79. Electron microscopy indicated the pigment was well distributed throughout the film in flocs of 0.4–1.2μ diameter.

Example 8

Toluene (300 parts) was placed in a reaction flask, heated to reflux temperature and held there. To the toluene was then added, continuously over a 4 hour period, a solution of 1700 parts of EA, 544 parts of BA, 287 parts of octadecyl methacrylate (OMA), 1300 parts of toluene, 8.2 parts azobisisobutyronitrile and 53.13 parts of 2-mercaptoethanol.

Refluxing was continued while 6 parts of azobisisobutyronitrile were added in three equal portions at 15 minute intervals. The container was then rinsed with 100 parts of toluene, which was added to the reaction mass.

This solution (3620 parts), 448 parts of Desmodur N and 1 part of dibutyltin dilaurate was stirred at reflux temperature for 2.5 hours. The mixture was then cooled at 40° C. and 261 parts of γ-aminopropyl triethoxysilane were added.

This solution was refluxed for one-half hour to give a solution, 64% solids, of a polymeric material represented by the formula $$B-SCH_2CH_2O\overset{O}{\overset{\|}{C}}N(CH_2)_6N\diagup\diagdown\begin{matrix}\overset{O}{\overset{\|}{C}}N(CH_2)_6N\overset{O}{\overset{\|}{C}}-N(CH_2)_3Si(OCH_2CH_3)_3\\ \\ CN(CH_2)_6NC-N(CH_2)_3Si(OCH_2CH_3)_3\\ \overset{\|}{O}\overset{}{}\overset{\|}{O}\end{matrix}$$

where B is an EA/BA/OMA terpolymeric segment.

Example 9

A polymeric material represented by the general structure $$B-SCH_2CH_2O\overset{O}{\underset{H}{C}}N(CH_2)_6N\begin{matrix}\overset{O}{\underset{H}{C}}N(CH_2)_6N\overset{O}{\underset{H}{C}}-SCH-COOH \\ | \\ CH_2COOH \\ \overset{O}{\underset{H}{C}}N(CH_2)_6N\overset{O}{\underset{H}{C}}-SCH-COOH \\ | \\ CH_2COOH \end{matrix}$$

where B is a MMA/vinyl acetate (VA) copolymeric segment was prepared by the procedure of Example 2, using 1200 parts of methyl methacrylate and 515 parts of vinyl acetate instead of the methyl methacrylate, and benzene instead of toluene.

Example 10

Methylisobutyl ketone (908 parts) and methylethyl ketone (100 parts) were placed in a reaction vessel, heated to reflux temperature and held there. To the solvent mixture was then added continuously, over a 4 hour period, a solution of 916 parts of MMA, 544 parts of 2EHA, 275 parts of methylisobutyl ketone, 3.7 parts of azobisisobutyronitrile and 17.9 parts of 2-mercaptoethanol.

Refluxing was continued while a solution of 2.8 parts of azobisisobutyronitrile in 28 parts of methylisobutyl ketone was added in 3 equals portions at 15 minute intervals. Solvent (250 parts) was distilled out and refluxing was continued for another 30 minutes, with water removal.

Desmodur N (174.6 parts) was then added to this solution and its container rinsed with 20 parts of methylisobutyl ketone, which was also added.

Dibutyltin dilaurate (1.5 parts) was then added. The solution was then heated at reflux temperature for 45 minutes and cooled to 60–70° C.

To this solution were added 96.6 parts of γ-aminopropyltriethoxy silane. The solution was then stirred for 15 minutes to give a solution, 58% solids, of a polymeric material represented by the formula $$B-SCH_2CH_2O\overset{O}{\underset{H}{C}}N(CH_2)_6N\begin{matrix}\overset{O}{\underset{H}{C}}N(CH_2)_6N\overset{O}{\underset{H}{C}}-N(CH_2)_3Si(OCH_2CH_3)_3 \\ \\ \overset{O}{\underset{H}{C}}N(CH_2)_6N\overset{O}{\underset{H}{C}}-N(CH_2)_3Si(OCH_2CH_3)_3 \end{matrix}$$

where B is a MMA/2-EHA copolymeric segment.

Example 11

Toluene (226.7 parts) was placed in a steel reaction kettle, heated to reflux temperature and held there. A solution of 226.7 parts of MMA, 126 parts of 2EHA, 90.7 parts of toluene, 4.44 parts of 2-mercaptoethanol and 0.903 part of azobisisobutyronitrile was then slowly added to the kettle over a 4 hour period.

Refluxing was continued as a solution of 0.25 part of azobisisobutyronitrile and 2.5 parts of methylisobutyl ketone was added in three equal portions at 15 minute intervals. A water separator was attached to the kettle and refluxing was continued for another 45 minutes to remove water.

Desmodur N (43.21 parts) was then added to the reaction mass and its container rinsed with 3.78 parts of toluene, which was also added to the mass. The mixture was stirred for five minutes.

Dibutyltin dilaurate (0.51 part) was then added and its container rinsed with 1.89 parts of toluene, which was also added to the mixture.

This solution was refluxed for one hour.

The product was then mixed with 1 mol of γ-mercaptopropyltriethoxy silane per equivalent of isocyanate in the polymeric intermediate. The reaction was complete in 45 minutes.

The product was a solution of a polymeric material represented by the general structure $$B-SCH_2CH_2O\overset{O}{\underset{H}{C}}N(CH_2)_6N\begin{matrix}\overset{O}{\underset{H}{C}}N(CH_2)_6N\overset{O}{\underset{H}{C}}-N(CH_2)_3Si(OCH_2CH_3)_3 \\ \\ \overset{O}{\underset{H}{C}}N(CH_2)_6N\overset{O}{\underset{H}{C}}-N(CH_2)_3Si(OCH_2CH_3)_3 \end{matrix}$$

where B is a MMA/2-EHA copolymeric segment.

Coating composition can be prepared with the polymeric materials of Examples 8–11 using the procedures of Example 1, with similar results.

Example 12

2-ethoxyethyl acetate (150 parts) was placed in a reaction vessel. The liquid was heated to 100° C. and held there as a solution of 940 parts of MMA, 298 parts of 2EHA, 125 parts of BA, 17.2 parts of 2-mercaptoethanol, 4.9 parts of azobisisobutyronitrile and 500 parts of 2-ethoxyethyl acetate was added continuously over a 4 hour period.

To 1000 parts of this solution were then added 82.5 parst of Desmodur N, 0.5 parts of dibutyltin dilaurate, and 300 parts of 2-ethoxyethyl acetate. The reaction mass was refluxed briefly and then added, over a two-hour period, to a mixture at reflux temperature, of 34 parts of cyanoguanidine and 400 parts of 2-ethoxyethyl acetate, previously heated at reflux temperature for one hour. Refluxing was continued for another hour. The solution was then cooled and decanted from excess cyanoguanidine.

The resulting product was a colorless nearly clear solution of a polymeric material represented by the structure $$B-SCH_2CH_2O\overset{O}{\underset{H}{C}}N(CH_2)_6N\begin{matrix}\overset{O}{\underset{H}{C}}N(CH_2)_6N\overset{O}{\underset{H}{C}}-NH-C\diagdown{}^{NH}_{NHCN} \\ \\ \overset{O}{\underset{H}{C}}N(CH_2)_6N\overset{O}{\underset{H}{C}}-NH-C\diagdown{}^{NH}_{NHCN} \end{matrix}$$

where B is a MMA/BA/2-EHA terpolymeric segment.

A mixture of 1 part of this solution, 1 part of phthalocyanine blue and 8 parts of xylene was sandground. The resulting pigment dispersion showed excellent deflocculation.

An automotive lacquer containing this dispersion gave a glossy film with excellent color development.

Example 13

A polymeric material was prepared according to the method of Example 12 by substituting 800 parts of EA, 172 parts of VAc, 256 parts of BA, 23.4 parts of 2-mercaptoethanol and 4.9 parts of azobisisobutyronitrile in 800 parts of 2-ethoxyethyl acetate as the base solution in the initial part of the reaction.

The resulting product was a solution of a polymeric material represented by the structure $$B-SCH_2CH_2O\overset{O}{\underset{H}{C}}N(CH_2)_6N\begin{matrix}\overset{O}{\underset{H}{C}}N(CH_2)_6N\overset{O}{\underset{H}{C}}-NH-C\diagdown{}^{NH}_{NHCN} \\ \\ \overset{O}{\underset{H}{C}}N(CH_2)_6N\overset{O}{\underset{H}{C}}-NH-C\diagdown{}^{NH}_{NHCN} \end{matrix}$$

where B is an EA/VAc/BA terpolymeric segment.

Example 14

A polymeric material was prepared according to the method of Example 13, using an initial solution of 1000 parts of EA, 320 parts of BA, 169 parts of OMA, 10 parts of tertiary butylperoctoate, 29.6 parts of 2-mercaptoethanol and 1000 parts of 2-ethoxyethyl acetate.

The product was a solution of a polymeric material represented by the structure

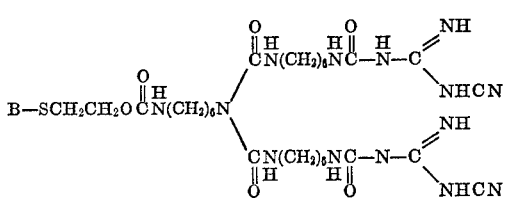

where B is an EA/BA/OMA terpolymeric segment.

Example 15

Toluene (226.7 parts) was placed in a steel reaction kettle. The toluene was heated to reflux temperature and held there while a solution of 226.7 parts of MMA, 126 parts of 2-EHA, 90.7 parts of toluene, 4.44 parts of 2-mercaptoethanol and 0.903 part of azobisisobutyronitrile was added over a 4 hour period.

A solution of 0.25 part azobisisobutyronitrile in 2.5 parts of methylisobutyl ketone was then added in three equal portions at 15 minute intervals. A water separator was then attached and refluxing was continued for another 45 minutes to remove water.

To this reaction mass were then added 43.21 parts of Desmodur N. The Desmodur container was rinsed with 3.78 parts of toluene, which was also added to the reaction mass. The mass was stirred for 5 minutes and 0.51 part of dibutyltin dilaurate was then added and its container rinsed with 1.89 parts of toluene, which was also added to the mass.

The resulting solution was then refluxed for one hour. Ammonia was bubbled through a sample of the above solution at 25° C., with stirring, for 15 minutes. Excess ammonia was then purged from the mass with a stream of nitrogen.

The product was a solution of a polymeric material represented by the structure

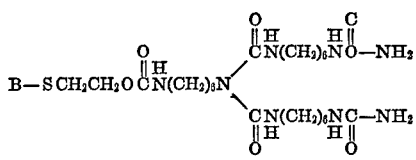

where B is a MMA/2-EHA copolymeric segment.

Example 16

Methylethyl ketone (241.9 parts) was placed in a steel reaction kettle. The methylethyl ketone was heated to reflux temperature and held there while a solution of 219.9 parts of MMA, 131.9 parts of 2EHA, 66 parts of methylethyl ketone, 4.3 parts of 2-mercaptoethanol and 0.88 part azobisisobutyronitrile was added over a 4 hour period.

Refluxing was continued as a solution of 0.22 part of azobisisobutyronitrile in 4.2 parts of methylethyl ketone was added in three equal portions at 15 minute intervals. Refluxing was then continued for another 30 minutes.

To this solution were then added 43.21 parts of Desmodur N. The container was then rinsed with 11 parts of methylethyl ketone which was also added to the reaction mass.

After this solution was stirred for 5 minutes, 0.5 part of dibutyltin dilaurate was added and its container rinsed with 4.4 parts of methylethyl ketone, which was also added to the reaction mass.

The solution was then refluxed for 2 hours.

This polymer solution (1200 parts) and 33.5 parts of 2,4 dinitroaniline were stirred and heated at reflux temperature for two hours.

The resulting product was a solution of a polymeric material represented by the structure

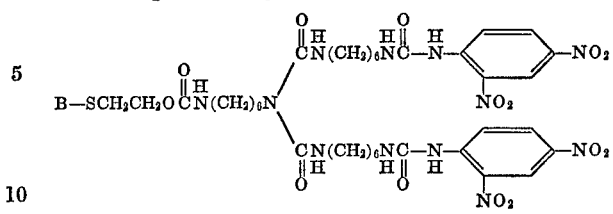

where B is a MMA/2-EHA copolymeric segment.

Example 17

A polymeric material was prepared according to the method shown in Example 16 by using 2-methoxy-5-nitroaniline in place of the 2,4-dinitroaniline.

The resulting polymeric product is represented by the structure

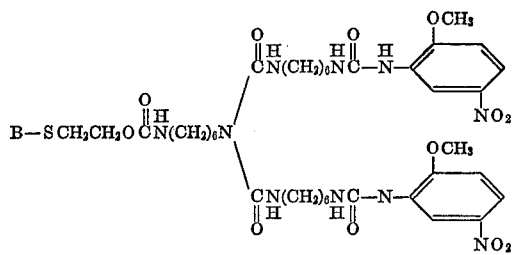

where B is a MMA/2-EHA copolymeric segment.

Example 18

A polymeric material was prepared according to the method of Example 16 by using diaminomaleonitrile in place of the 2,4-dinitroaniline.

The resulting product was a polymeric material represented by the structure

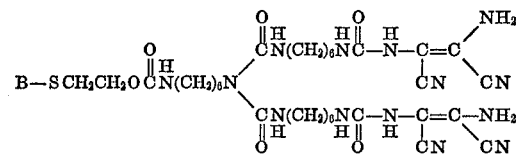

where B is a MMA/2-EHA copolymeric segment.

Example 19

To 1200 parts of the solution of the diisocyanate terminated polymeric intermediate prepared in Example 15 were added 15.9 parts of 3-amino-1H-1,2,4-triazole and 310 parts of 2-ethoxyethyl acetate.

This mixture was stirred for 2 hours at 25° C. and then heated at about 100° C. until the solids dissolved.

The solution was then cooled to give a solution of a polymeric material represented by the structure

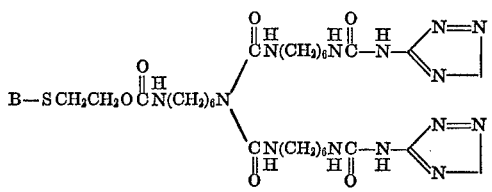

where B is a MMA/2-EHA copolymeric segment.

Example 20

Benzene (250 parts) was placed in a reaction vessel. The benzene was then heated to reflux temperature and held there while a solution of 1000 parts of EA, 320 parts of BA, 169 parts of OMA, 30 parts of 2-mercaptoethanol and 8.2 parts of azobisisobutyronitrile in 950 parts of benzene was added continuously over a 5 hour period.

The resulting solution was concentrated on a rotary evaporator to give 1496 parts of a stiff, colorless oil.

Twenty-seven parts of this oil were dissolved in 100 parts of dimethylformamide and the solution mixed with a solution of 3.5 parts of Desmodur N and 0.1 part of dibutyltin dilaurate in 30 parts of dimethylformamide.

The resulting solution was then stirred at 140° C. for 3 hours and 1.6 parts of melamine added.

This solution was heated for another 2 hours at 140° C. and then poured into water. The oil which separated was washed with water, dissolved in tetrahydrofuran and dried under vacuum to give 19.5 parts of a glassy polymeric material represented by the structure

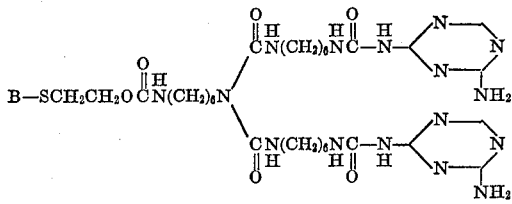

where B is an EA/BA/OMA terpolymeric segment.

Example 21

A mixture of 3008 parts of the isocyanate terminated intermediate polymer prepared in Example 1, 10.5 parts of 2-ethoxyethyl acetate and 54 parts of N,N-dimethylethylenediamine was stirred for 1 hour at room temperature and then held at 100° C. for 15 minutes.

The resulting product was a 50% solution of a polymeric material represented by the structure

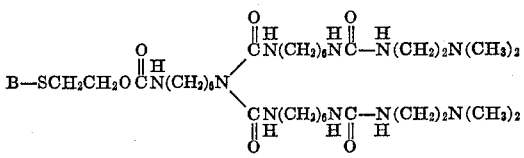

where B is a MMA/2-EHA copolymeric segment.

Example 22

The solution product of Example 21 (536 parts) was mixed with 22.8 parts of methyl iodide and 200 parts of methylethyl ketone at room temperature.

This mixture was allowed to stand for 4 days at room temperature. The resulting solution was then filtered through Celite to give a solution of a polymeric material represented by the structure

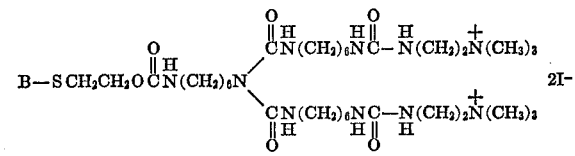

where B is a MMA/2-EHA copolymeric segment.

Example 23

The isocyanate terminated intermediate polymer solution prepared in Example 16 (700 parts) was heated to reflux temperature and held there while a solution of 18.7 parts of 9-aminoacridine in 374 parts of methylethyl ketone was added. The mixture was then refluxed for another 15 minutes.

The resulting product was a solution of polymeric material represented by the structure

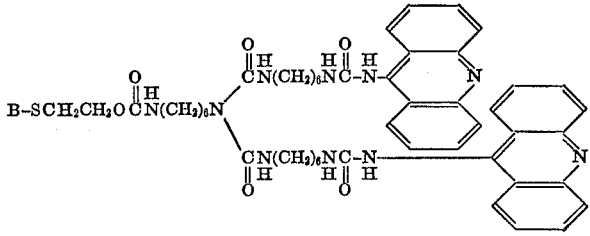

where B is a MMA/2-EHA copolymeric segment.

The polymeric materials of Examples 12–23 can be used to prepare coating compositions in the same fashion as shown in Example 1, 2 or 7 with similar results.

I claim:

1. In a coating composition comprising
   (a) a film-forming polymer;
   (b) an organic liquid carrier; and
   (c) particles dispersed in the liquid carrier;

the improvement comprising the presence in the composition, as an anti-flocculating agent, molecules of a linear polymeric material represented by the structure

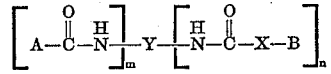

where
A is

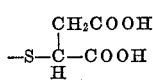

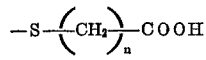

(where $n$ is 1–3)

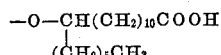

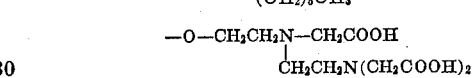

or

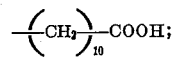

Y is the residue of a di-, tri- or tetraisocyanate radical;
X is —S—R—D— where R is alkylene of 1–6 carbon atoms and

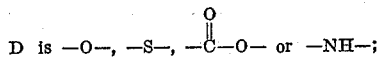

B is a polymeric segment of an ester of acrylic acid or methacrylic acid with an alkanol of 1–18 carbon atoms; styrene; acrylonitrile; a vinyl ester whose ester moiety contains 2–18 carbon atoms; or a vinyl ether; and $m$ and $n$ are 1, 2 3 or (the total not exceeding 4);

providing that when $n$ is 2 or 3, only one of A need be as defined.

2. The composition of claim 1 wherein the antiflocculating agent is represented by the structure

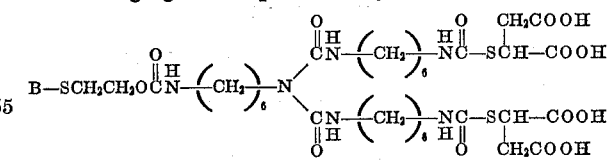

where B is a methyl methacrylate/2-ethylhexyl acrylate copolymeric segment.

3. The composition of claim 1 wherein the antiflocculatinng agent in (c) is represented by the structure

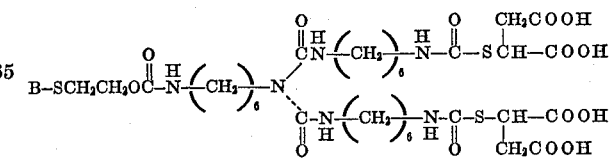

where B is a lauryl methacrylate/ethyl acrylate/methyl methacrylate terpolymer segment.

4. In a coating composition comprising
   (a) a film-forming polymer;
   (b) an organic liquid carrier; and
   (c) particles dispersed in the liquid carrier;

the improvement comprising the presence in the composition, as an anti-flocculating agent, molecules of a linear polymeric material represented by the structure $$\left[ A-\overset{O}{\underset{\|}{C}}-\overset{H}{\underset{|}{N}} \right]_m - Y - \left[ \overset{H}{\underset{|}{N}}-\overset{O}{\underset{\|}{C}}-X-B \right]_n$$

where
A is

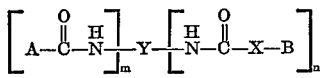
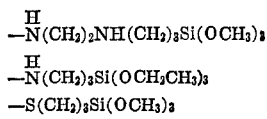

or

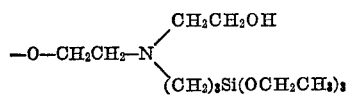

Y is the residue of a di-, tri- or tetraisocyanate radical;
X is —S—R—D— where R is alkylene of 1-6 carbon atoms and D is —O—, —S—, —C—O— or —NH—;
B is a polymeric segment of an ester of acrylic acid or methacrylic acid with an alkanol of 1-18 carbon atoms; styrene; acrylonitrile; a vinyl ester whose moiety contains 2-18 carbon atoms; or a vinyl ether; and m and n are 1, 2 or 3 (the total not exceeding 4);
providing that when n is 2 or 3, only one of A need be as defined.

5. The composition of claim 4 wherein the antiflocculating agent is represented by the structure

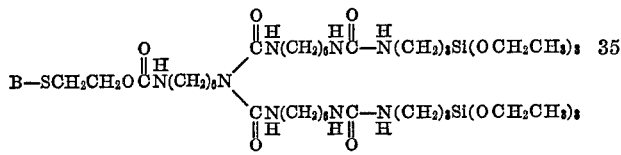

where B is a methyl methacrylate/2-ethylhexyl acrylate copolymer segment.

6. In a coating composition comprising
(a) a film-forming polymer;
(b) an organic liquid carrier; and
(c) particles dispersed in the liquid carrier;
the improvement comprising the presence in the composition, as an anti-flocculating agent, molecules of a linear polymeric material represented by the structure $$\left[ A-\overset{O}{\underset{\|}{C}}-\overset{H}{\underset{|}{N}} \right]_m - Y - \left[ \overset{H}{\underset{|}{N}}-\overset{O}{\underset{\|}{C}}-X-B \right]_n$$

where A is —NH₂

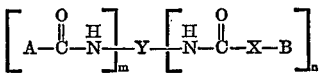

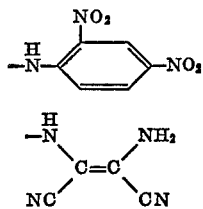

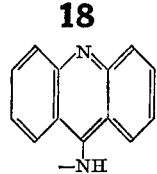

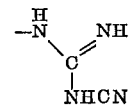

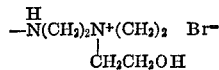

or

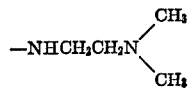

Y is the residue of a di-, tri- or tetraisocyanate radical;
X is —S—R—D— where R is alkylene of 1-6 carbon atoms and D is —O—, —S—, —C—O— or —NH—;
B is a polymeric segment of an ester of acrylic acid or methacrylic acid with an alkanol of 1-18 carbon atoms; styrene; acrylonitrile; a vinyl ester whose moiety contains 2-18 carbon atoms; or a vinyl ether; and m and n are 1, 2 or 3 (the total not exceeding 4);
providing that when n is 2 or 3, only one of A need be as defined.

7. The composition of claim 6 wherein the anti-fluocculating agents is

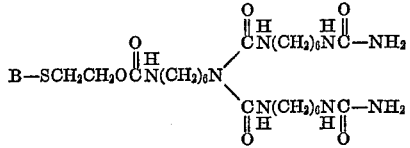

where B is a methyl methacrylate/2-ethyhexyl acrylate copolymeric segment.

References Cited
UNITED STATES PATENTS

| | | | |
|---|---|---|---|
| 3,166,524 | 1/1965 | Schmidle et al. | 260—23 |
| 3,317,635 | 5/1967 | Osmond | 260—34.2 |
| 3,382,297 | 5/1968 | Thompson | 260—875 |
| 3,393,162 | 7/1968 | Cox et al. | 260—4 |
| 3,405,087 | 10/1968 | Fryd | 260—34.2 |
| 3,411,944 | 11/1968 | Highashi | 252—62.54 |
| 3,433,753 | 3/1969 | Farkas | 260—22 |
| 3,505,268 | 4/1970 | Backhouse et al. | 260—31.2 |
| 3,514,500 | 5/1970 | Osmond et al. | 260—874 |
| 3,532,662 | 10/1970 | Ansdell | 260—34.2 |

DANIEL E. WYMAN, Primary Examiner
A. P. DEMERS, Assistant Examiner

U.S. Cl. X.R.

252—351, 363.5; 260—29.1 R, 29.6, 31.2 R, 31.2 N, 31.4, 31.8 A, 32.4, 33.2, 33.4 R, 33.4 UR, 33.6 UB, 34.2, 37